ic tubes 31 and an aluminum sleeve 44 is placed

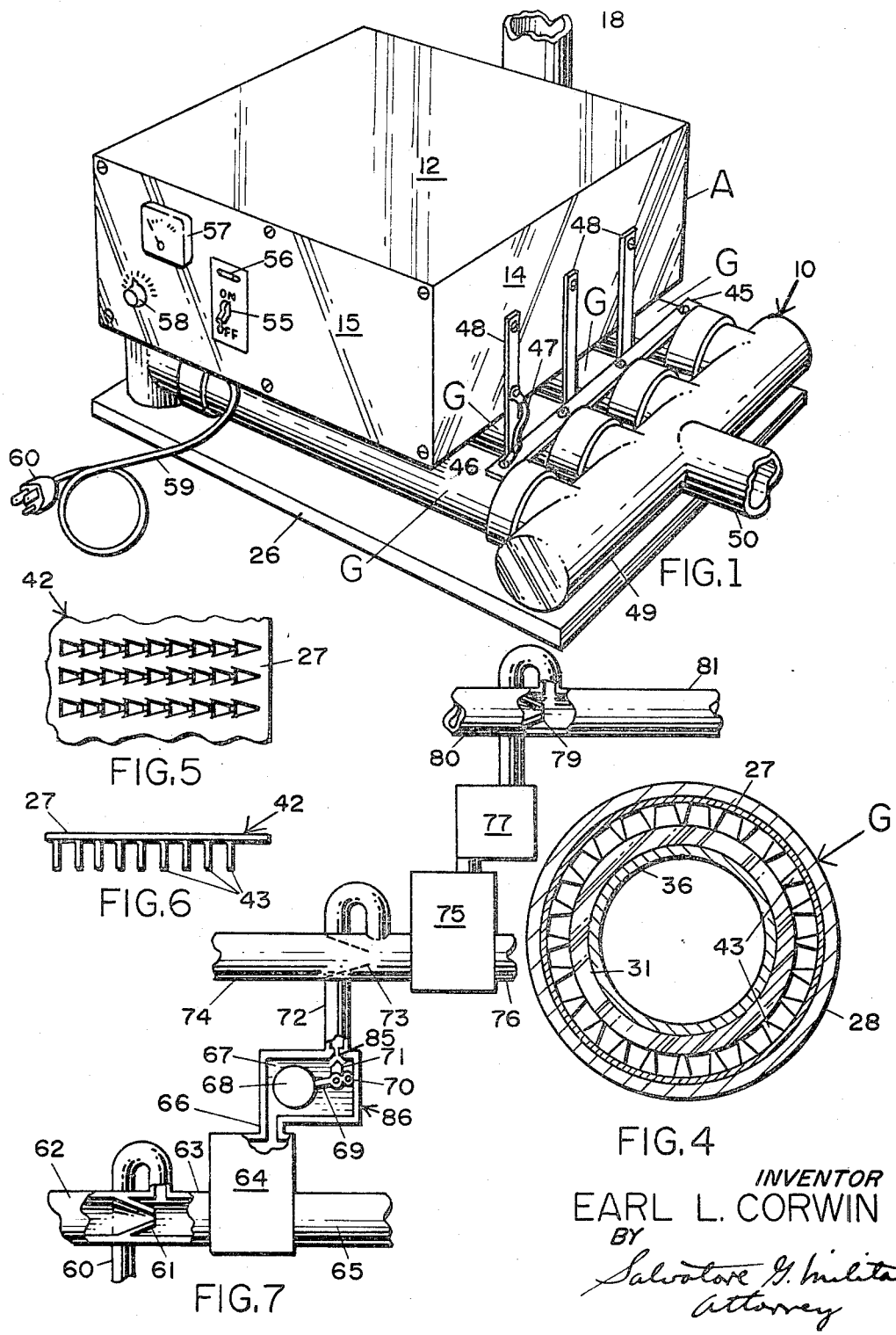

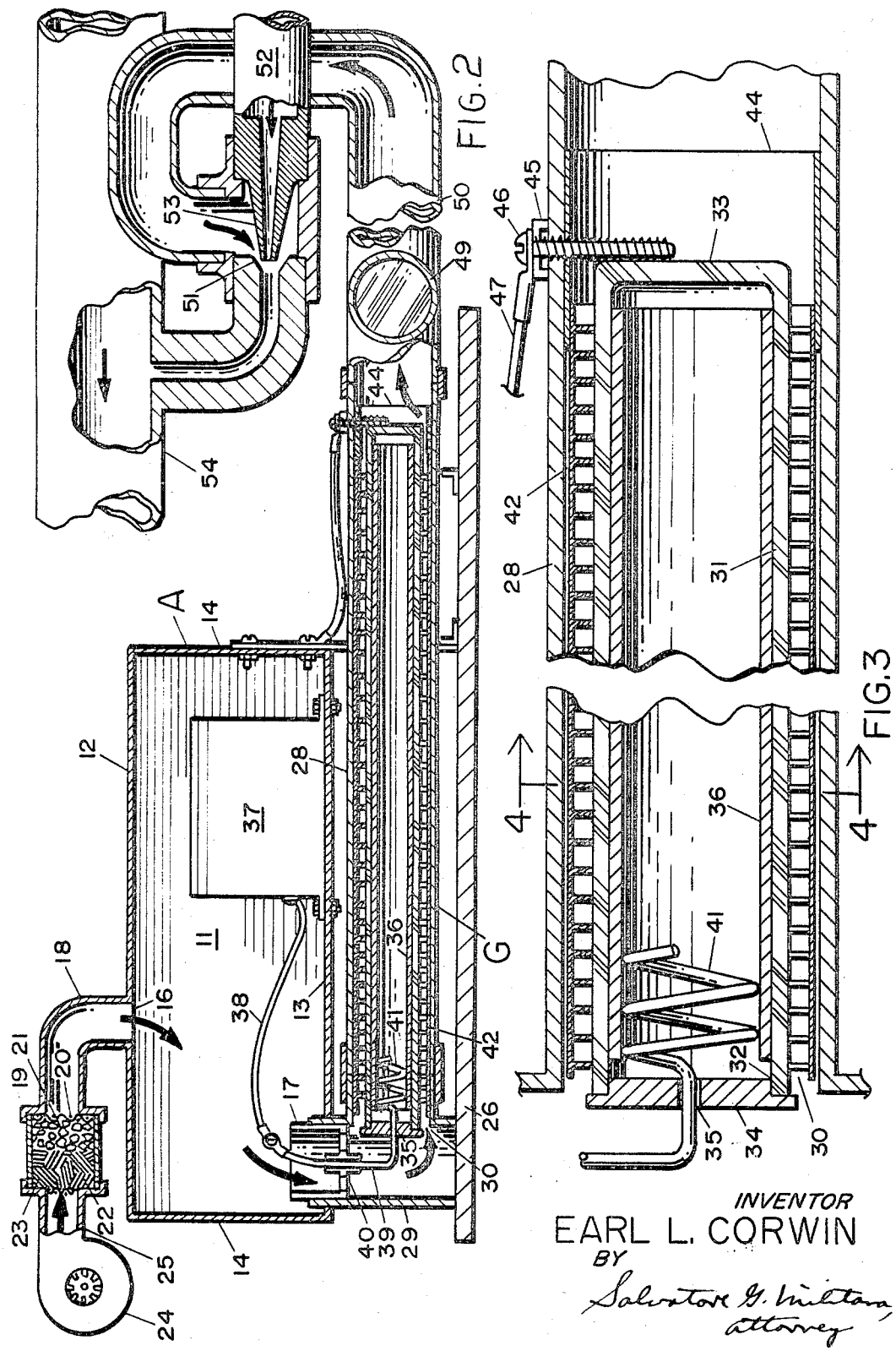

United States Patent Office 3,421,999
Patented Jan. 14, 1969

3,421,999
OZONE GENERATOR FOR PURIFYING A
CONTAMINATED FLUID SYSTEM
Earl L. Corwin, Miami, Fla., assignor to
Tri-O Dynamics, Inc., Miami, Fla.
Filed Mar. 28, 1966, Ser. No. 537,761
U.S. Cl. 204—314       3 Claims
Int. Cl. C01b 13/12

This invention relates to ozone generators and is more particularly directed to a device consisting of a plurality of cylindrical ozone generator units.

A principal object of the present invention is to provide an ozone generating device with an air inlet filter device which removes the carbon dioxide and carbon monoxide particles as well as other impurities whereby a higher yield of negative ions are produced thus increasing the capability of the ozone to purify contaminated fluids.

Another object of the present invention is to provide an ozone generating device consisting of a plurality of cylindrical ozone generators wherein the ozone produced is collected in a header and discharged at a venturi for mixing with contaminated fluids.

A further object of the present invention is to provide an ozone generating system wherein ozone is generated and discharged to purify water used in a pool, then the excess ozone is collected and discharged to purify drinking water, and the excess ozone is again collected and discharged into the air conditioning system for purifying air in a home.

A still further object of the present invention is to provide an ozone generating system which is simple and compact in construction, inexpensive in cost and most effective in the production of maximum quantity of ozone for purifying contaminated liquids, gases and effluents.

With these and other objects in view, the invention will be best understood from a consideration of the following detailed description taken in connection with the accompanying drawings forming a part of this specification, with the understanding, however, that the invention is not confined to any strict conformity with the showing of the drawings by may be changed or modified so long as such changes or modifications mark no material departure from the salient features of the invention as expressed in the appending claims.

In the drawings:

FIGURE 1 is a perspective view of an ozone generating device constructed in accordance with my invention.

FIGURE 2 is a longitudinal cross sectional view of my ozone generator with the intake and exhaust systems added and partially broken away.

FIGURE 3 is an enlarged cross sectional view of an ozone generator unit.

FIGURE 4 is a cross sectional view taken along the line 4—4 of FIGURE 3.

FIGURE 5 is a fragmentary top plan view of a grid.

FIGURE 6 is a side elevational view thereof.

FIGURE 7 is a schematic drawing of a complete ozone distribution system for the home.

Referring to the drawings wherein like numerals are used to designate similar parts throughout the several views, the numeral 10 refers to an ozone generating device constructed in accordance with my invention and consisting of a box-like metallic casing A having a top wall 12, bottom wall 13, front and rear walls 14 and side walls 15, forming an en enclosed chamber 11. The chamber 11 is provided with an air inlet 16 and a plurality of outlets 17, one each outlet 17 for each ozone operator element G of which there are four by way of illustration as any number of such ozone generators may be used.

The inlet 16 is connected by an air duct 18 whose other end is connected to a filter member 19 in which there is a bronze screen 20 positioned across the outlet of the filter 19. Activated charcoal particles 21 are placed against the screen 20 with rock wool 22 filling the chamber 23 of the filter 19 to maintain the activated charcoal 21 against the screen 20. A squirrel cage blower 24 is mounted on the inlet end of an air duct 25 while the outlet end is connected to the filter 19 so that upon actuating the fan 24, air under pressure will flow into the filter 19 through the rock wool 23 which removes dust and other foreign particles in the air. Then the air passes through the activated charcoal 21 which purifies the air of carbon dioxide and carbon monoxide, the purified air passing through the air duct and into the chamber 11.

The metallic casing A is mounted on a plurality of individual ozone generator units G which lie in a horizontal plane and are mounted on a platform 26. Each of the ozone generator units G consists of a plastic tubular member 28 one end of which is the inlet end connected to an opening 30 in a vertically positioned plastic tube 29. The plastic tubes 29 are telescopically fastened to each of the air outlet tubes 17 so that air flowing from the chamber 11 will flow through the tubes 17 and 29, is discharged through the opening 30 and into the ozone generator tubes G.

Within each of the ozone generator tubes G there is a glass tubular member 31 having an opening 32 at one end and an end wall 33 at the other end. The opening 32 is blocked off by a cap or cover 34 cemented in the opening 32 and provided with a centrally disposed bore 35. Positioned within the glass tube 28 and in contact relation with inner surface thereof is an aluminum tubing 36 which extends approximately the full length of the glass tube 31. The tubing 36 forms the anode for the electrical system being connected to a transformer 37 mounted in the chamber 11. An insulated lead 38 is connected at one end to the secondary of the transformer 37 whose primary is connected to a source of electricity (not shown), while the other end is connected to an uninsulated high voltage conductor 39. The latter extends through a plastic support member 40 mounted in the tubular member 17 and extends through the opening 35 terminating in a coiled portion 41 in contact relation with the anode 36.

Positioned about the dielectric or glass tube 31 is a grid 42 formed in a tubular shape and having a plurality of prongs 43 in contact relation with and extending in the direction of the glass tube 31. A preferable manner of producing the grid 42 is to take a sheet of aluminum 27 and punch the prongs 43 through the sheet of aluminum 27 much in the same manner as in producing a cheese grater. The two such sheets of aluminum 27 are cut to approximately the length of the glass tube 31 and one-half the circumference of the glass tube 31. These two pieces of aluminum sheets 27 are then shaped to fit about the glass tube 31. At the extreme end of the glass tube 31 an alumnium sleeve 44 is fitted telescopically over the grid 42 extending beyond the end of the glass tube 31. The function of the aluminum sleeve 44 is to electrically connect the two halves forming the grid 42 so as to properly ground them. The ground consists of a bar 45 which extends across the ozone generators G is provided with a plurality of bores for receiving a screw bolt 46 that engages each of the sleeves 44. The screw bolt 46 passes through a bore formed in the sleeve 44 and operates as a stop for the glass tubing 31. A ground wire 47 is connected at one end to the bolt 46 and to the metallic casing A. Straps 48 secure the metallic casing A to the platform 26 and for purposes of convenience the ground wire 47 is connected to one of the metallic straps 48 for grounding all of the grids 42. Since there is a cap 34 mounted over the opening 32 of the dielectric glass tube 31, no air can enter the glass tube 31. The useful life of the anode 36 is extended many times its normal life by preventing air from flowing into the glass tube 31. In the process of creating the corona by means of a high voltage impressed on the anode 36, impurities in the air will be deposited on the anode 31 causing a film to form thereon. This film offers resistance to the flow of electricity. With the chamber within the dielectric completely closed off, no deposit is formed on the anode 36.

Connected to the plastic tubes 28 is a tube 49 which received the ozone discharged by the tubes 28 and discharges it to a tube 50. The tube 50 is connected to a venturi 51 in which contaminated fluid under pressure is discharged through a pipe 52. The force of the contaminated fluid flowing through the pipe 52 and discharged by the venturi nozzle 53 aspirates ozone through the venturi 51 and causing the mixing of the ozone and the contaminated fluid. The ozone immediately attacks the bacteria microorganisms and other contaminating causing impurities and foreign bodies to purify the contaminated fluid which is discharged to the pipeline 54 where the fluid is directed to its destination where it is stored or used.

Mounted on the outer surface of the side wall 15 of the casing A is a switch 55 with a fuse 56 connected in the circuit as protection against over-loading the circuit. Also, mounted on the side wall 15 as a volt meter 57 and a variack or rheostat 58 for varying the voltage of the current passing to the primary of the transformer. An electric conduit 59 having a male plug 60 extends into the chamber 11 of the casing A and is connected to the primary of the transformer 37. Since the wiring circuit is conventional, details of same are not shown or described and are indicated merely to show applicant's device 10 as it is now manufactured and sold.

As explained in detail hereinabove, atmosphere entering the duct 25 is purified by the activated charcoal 21 and rock wool 22 of carbon monoxide, carbon dioxide, dust and other impurities found in the air and discharged into the chamber 11. The air then passes through the several ducts 17 and into the opening 30 between the glass tube 31 and the outer surface of the grid 42 passing along the prongs 43.

With the electric conduit 59 connected to a source of current having approximately 110 to 115 volts, and the variack adjusted to the amount of ozone desired, current of high voltage will flow through the electric conduit 38, the conductor 39, 41 to the anode 36. A corona will form about the outer surface of the glass tube or dielectric 31, the corona being created by the inability of the current to pass through the dielectric 31 despite the high voltage (pressure).

As air passes along the outer surface of the dielectric glass tube 31, it mixes with the ozone created therein and is discharged into the manifold 49 and out through the discharge pipe 50.

The device 10 is capable of transforming the 110–110 volt house current to as much as 10,000 volts which are impressed on the anode 36. With the air purified of its carbon dioxide and carbon monoxide less positive ions, which are deleterious, are produced and a greater quantity of negative ions are created by the corona and deposited into the path of air, the mixture then being delivered to decontaminate any contaminated fluid such as sewerage effluents, industrial waste, water for drinking purposes or for adding ozone for conditioned air.

In FIGURE 7 there is shown a schematic diagram of a system that is adapted for a typical home. The contaminated fluid in this instance is well or pool water flowing through the pipe 62 to the venturi 61 where the ozone and air mixture produced by my ozone generating device 10 is delivered through the pipe 60. The mitxure is delivered by a pipe 63 to the tank 64 which delivers the purified water to a pool through the valved pipe 65.

The excess ozonized air is collected at the top of the tank 64 and is drawn off by the pipe 66 into a float operated release valve 86 having an enclosed chamber 67 in which there is a float 68 mounted on the end of a lever 69. The lever 69 is pivotally mounted as at 70 at its other end. Adjacent the pivot pin is a valve 71 which is adapted to be seated on a valve seat 85 which controls the discharge of ozonized or ionized air through the pipe 72. As can be readily seen no water can escape past the valve 71 since any water in the casing 86 will cause the float 68 to rise to seat the vaive 71. The excess air leaving the tank 65 will pass through the float valve 86, into pipe 72 and to the venturi 73 where drinking water is being discharged from the pipe 74. The mixture of air and water is delivered to the tank 75 from which the purified water is drawn off to the various outlets in the house through the valved water conduit 76.

Again the excess air is released and permitted to flow into another float operated release valve 77 which is identical in construction and function as the above described float operated release valve 86. The excess air leaving the drinking water tank 75 passes through the float operated release valve 77 into pipe 78 and to a further venturi 79. A duct for air conditioned air 80 directs the air conditioned air to the venturi 79 where the air conditioned air will mix with the remaining ionized air to purify the air conditioned air and deliver the latter to a duct 81 which directs the air throughout the house being air conditioned.

Having disclosed my invention, what I claim as new and desire to secure by Letters Patent is:

1. An ozone generating system comprising a metallic casing forming an enclosed chamber, said metallic casing having an inlet duct and a plurality of outlets, a plurality of ozone generating units mounted in proximity of said metallic casing, each of said ozone generating units consisting of a plastic tubular member having an outlet and an inlet communicating with one of said plurality of casing outlets, a glass tube having an end wall mounted concentrically in said plastic tubular member, a metallic tubular member positioned within said glass tube and in contact relation thereto along substantially its full length, a cap enclosing on an open end of said glass tube, said cap having an opening therein, a further metallic tubular member mounted within said plastic tubular member in spaced relation to said glass tube, and having a multiplicity of prongs struck from said further metallic tubular member and directed toward said glass tube, said prongs having a free end engaging said glass tube and forming passageways for air to pass from said tubular inlet to said outlet of said plastic tubular member, a tubular header connected to said last named outlets of said plastic tubular members, a ground connecting said further metallic tubular members and said casing, a transformer mounted in said chamber, a plurality of electric conduit means connected at one end to said transformer and extending through said opening in said caps and connected at the other end to each of said first named metallic tubular members, filter means for filtering out carbon monoxide and carbon dioxide and fan means mounted at said casing inlet duct for directing filtered air into said chamber and through siad passageways in said ozone generating units.

2. The structure as recited by claim 1 wherein said filter means comprises a plurality of particles of activated charcoal and rock wool fibers for substantially purifying the air passing therethrough.

3. The structure as recited by claim 2 taken in combination with venturi means connected to a source of contaminated water, a tubular header connected to said outlets of said plastic tubular members, a duct connecting said header and said venturi means for mixing ozone and contaminated water, said venturi means having an outlet, a water tank, an inlet in said tank connected to said outlet of said venturi means, air release valve means mounted at a top portion of said tank for discharging excess ozone in said tank, means connecting said air release valve means and further venturi means, said further venturi means having an inlet and an outlet, water pipe means connected to said inlet of said venturi means for mixing drinking water and said excess ozone, further tank means connected to said outlet for receiving said mixed excess ozone and drinking water, further air release valve means mounted on said last named tank for discharging further excess ozone, an air duct, means connecting said further air release valve means and said air duct for directing and mixing said further excess ozone with air passing through said air duct.

References Cited

UNITED STATES PATENTS

| | | | |
|---|---|---|---|
| 2,308,111 | 1/1943 | Schuette | 204—320 |
| 2,660,559 | 11/1953 | Prime | 204—321 |
| 2,771,416 | 11/1956 | Ryan | 204—314 |
| 2,862,865 | 12/1958 | Marky | 204—321 |
| 2,876,188 | 3/1959 | Thorp et al. | 204—314 |

ROBERT K. MIHALEK, *Primary Examiner.*

U.S. Cl. X.R.

204—320, 321; 210—192.